United States Patent [19]
Slocum

[11] Patent Number: 5,836,638
[45] Date of Patent: Nov. 17, 1998

[54] FUEL DOOR ASSEMBLY

[75] Inventor: Brian D. Slocum, Manhattan, Ill.

[73] Assignee: Illinois Tool Works Inc., Glenview, Ill.

[21] Appl. No.: 762,097

[22] Filed: Dec. 9, 1996

[51] Int. Cl.[6] .............................. B60J 9/00; E05C 19/16
[52] U.S. Cl. ............ 296/97.22; 220/86.2; 220/DIG. 33; 292/341.15; 292/DIG. 4
[58] Field of Search ..................... 296/97.22; 220/86.2, 220/DIG. 33; 292/341.15, DIG. 4, 13, 17

[56] References Cited

U.S. PATENT DOCUMENTS

| | | | |
|---|---|---|---|
| 4,702,506 | 10/1987 | Limura | 292/DIG. 4 X |
| 4,709,949 | 12/1987 | Umezawa et al. | 292/DIG. 4 X |
| 4,782,978 | 11/1988 | Appleby et al. | 296/97.22 X |
| 4,792,165 | 12/1988 | Nishimura | 292/DIG. 4 X |
| 4,811,984 | 3/1989 | Hempel | 296/97.22 |
| 5,044,678 | 9/1991 | Detweiler | 296/97.22 X |
| 5,165,749 | 11/1992 | Sheppard | 296/97.22 |
| 5,217,262 | 6/1993 | Kurosaki | 292/DIG. 4 X |
| 5,518,223 | 5/1996 | Bivens | 267/34 |

*Primary Examiner*—Joseph D. Pape
*Attorney, Agent, or Firm*—Kane, Dalsimer, Sullivan, Kurucz, Levy, Eisele and Richard, LLP

[57] ABSTRACT

A fuel door assembly comprises a housing having an open main compartment, a door covering the main compartment when in a closed position with respect thereto, and a push-push lock engagable with the door by means of a latch on its inner surface. The push-push lock is reciprocatingly operable between a first fixed position and a second fixed position. When in the first fixed position, the push-push lock holds the door in a completely closed condition. When in the second fixed position, the push-push lock holds the door in a partially opened condition, so that it may be grasped manually and moved to a fully opened condition. The fuel door assembly satisfies the styling desire for a flat hidden door lacking a finger opening, but at lower cost than that associated with a cable or electrical solenoid opening mechanism. The fuel door assembly further will not fly open if accidentally activated, such as by equipment in a car wash.

3 Claims, 5 Drawing Sheets

FUEL DOOR ASSEMBLY

BACKGROUND OF THE INVENTION

1. Field of the Invention

The present invention relates to a fuel door assembly for gaining access to a gas tank in a motor vehicle. More specifically, the invention is a fuel door assembly which incorporates a push-push latch mechanism which provides an auxiliary latch to hold the door in a partly opened position.

2. Description of the Prior Art

Fuel door assemblies for motor vehicles are well-known in the art. Generally, they comprise a door which gives access to the tube through which gasoline or some other fuel is pumped into a fuel tank. More often than not, one must first remove a gas tank cap, which usually is provided with locking means, after opening the door to uncover the tube through which fuel may be pumped into the tank.

Usually, the fuel door is flush with one of the rear quarter panels of the motor vehicle, and is finished in the same color as the vehicle. In many cases, the panel at the edge of the door is provided with an indentation at a point opposite where the door is hinged, so that one may pry the door open from a latched position. Alternatively, the door is often latched against a biasing force which would otherwise tend to open the door by a mechanism releasable only from within the motor vehicle. Usually, such a mechanism is released by means of a device, such as a lever, within reach of the driver and connected by a cable to the releasing mechanism, or an electrical solenoid. When the device pulls the cable or activates the solenoid, the door is popped open by the biasing force.

The present invention presents an alternate approach for latching a fuel door requiring neither an indentation, a cable release mechanism for opening, nor an electrical solenoid. It also provides a fuel door assembly having an auxiliary latch which holds the door ajar in a partly opened position, so that it may be grasped and manually opened to a fully opened position.

SUMMARY OF THE INVENTION

Accordingly, the fuel door assembly of the present invention comprises a housing, which has an open main compartment including an opening to which a tube leading to a fuel tank may be attached.

A door is hingedly connected to the housing and covers the main compartment when in a closed condition. The door includes a latch which maintains it in the closed condition.

A push-push lock is attached to the main compartment of the housing, and is reciprocatingly operable between a first fixed position and a second fixed position. The push-push lock is engagable with the latch. The door is locked in a fully closed condition upon the main compartment when the push-push lock is in the first fixed position, and is in a partially opened condition, ajar with respect thereto, when the push-push lock is in the second fixed position.

The present invention will now be described in more complete detail, with frequent reference being made to the drawing figures identified hereinbelow.

DETAILED DESCRIPTION OF THE PREFERRED EMBODIMENT

Figure 1:
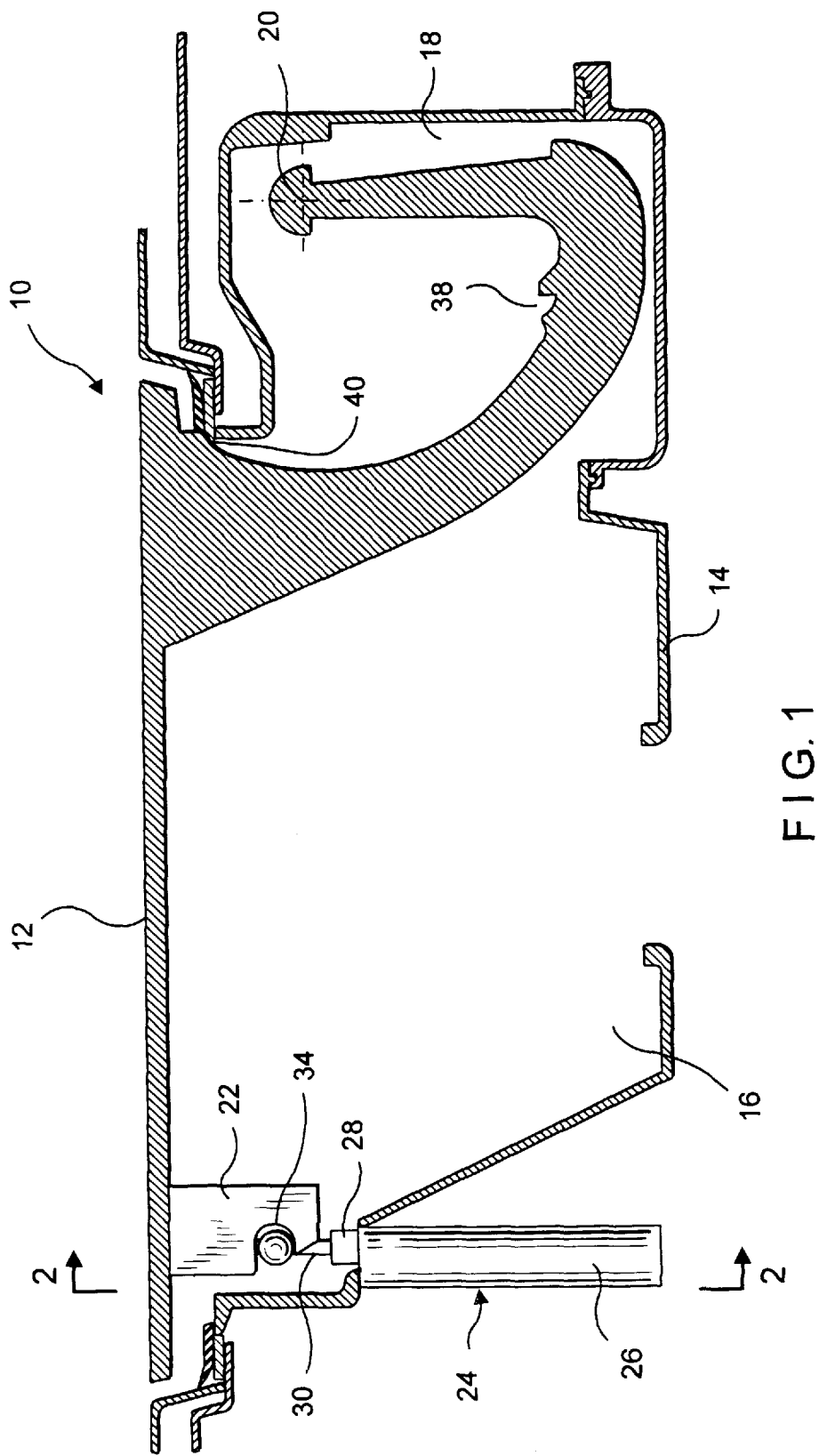
FIG. 1 is a cross-sectional view of the fuel door assembly of the present invention.

FIG. 1 is a cross-sectional view of the fuel door assembly 10 of the present invention. The fuel door assembly 10 comprises a fuel door 12 and a fuel housing 14. At the bottom of the main compartment 16 of the fuel housing 14, as depicted in FIG. 1, is an opening to which a tube ultimately leading to a fuel tank may be connected.

Housing 14 includes a side compartment 18 within which door 12 is connected by hinge member 20 for swinging opening and closing movement. Fuel door 12 also includes a latch 22 on its inner surface.

As shown in FIG. 1, fuel door assembly 10 is in its fully closed condition wherein it is held by push-push lock 24. Lock 24 comprises a housing 26 of generally cylindrical shape and a piston 28, which is reciprocatingly movable between two fixed positions within housing 26.

Piston 28 is disposed in housing 26, wherein it is acted upon by a biasing member, such as a spring, which tends to move the piston 28 outward from the housing 26, or upward as depicted in FIG. 1. When the fuel door assembly 10 is locked in its fully closed condition, piston 28 is locked in a first of two fixed positions against the outward force of the biasing agent. Atop piston 28 is a T-shaped member 30, to be shown more clearly in figures to follow, which engages with latch 22 to hold the door 12 in the fully closed condition.

Figure 2:
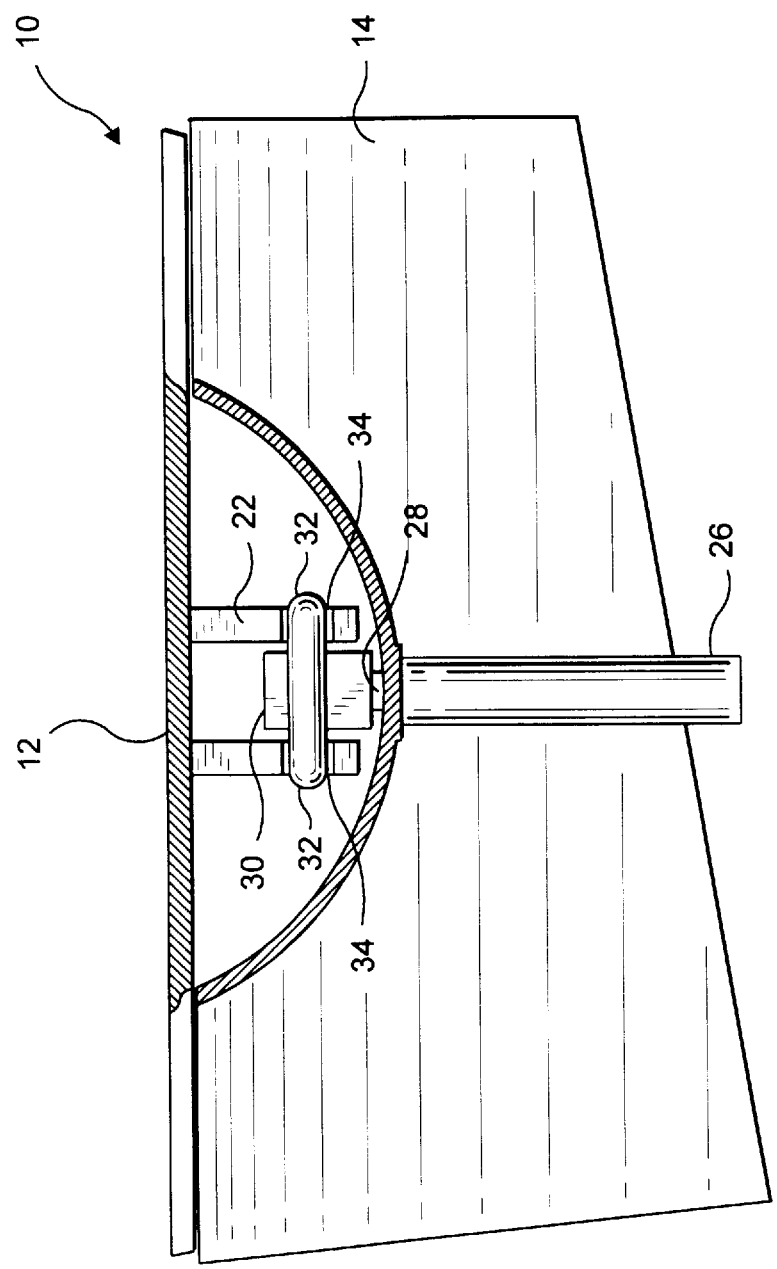
FIG. 2 is a cross-sectional view taken as indicated by line 2—2 in FIG. 1.

FIG. 2 is a cross-sectional view taken as indicated by line 2—2 in FIG. 1. T-shaped member 30 atop piston 28 includes two arms 32, which are disposed in notches 34 of latch 22 to keep door 12 in a closed condition.

Figure 3:
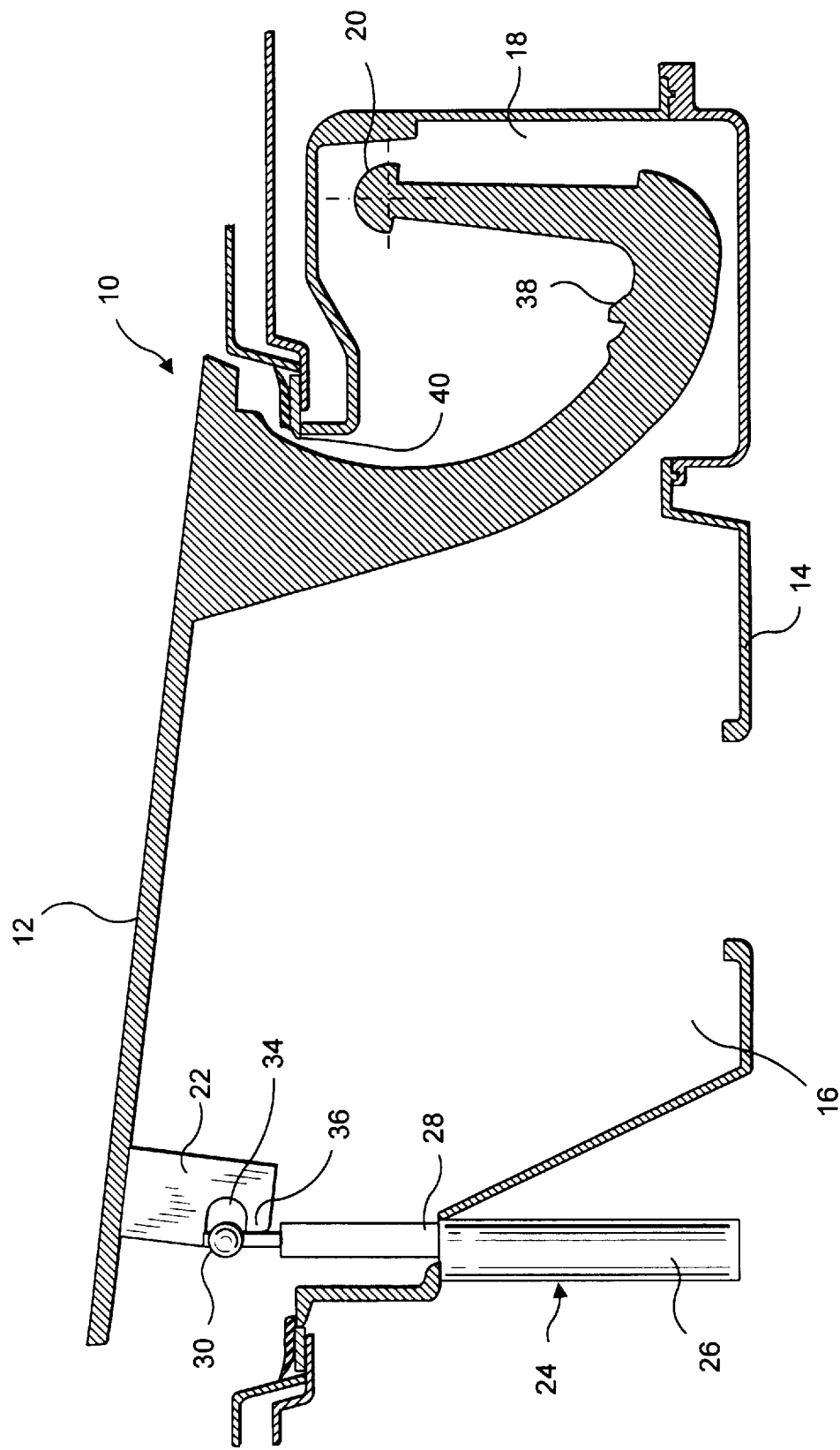
FIG. 3 is a cross-sectional view of the fuel door assembly in a partially opened condition.

FIG. 3 is a cross-sectional view of the fuel door assembly 10 in its partially opened condition, wherein it is held still by push-push lock 24. In this partially opened condition, piston 28 is disposed in a second of two fixed positions against the outward force of the biasing agent. T-shaped member 30 still holds latch 22 of door 12 in this partially opened condition. In this condition, one may release the door 12 manually from push-push lock 24 by pulling it upward. Chamfer 36 at the bottom of latch 22 allows arms 32 of T-shaped member 30 to slide out of notches 34 to release the door 12.

Figure 4:
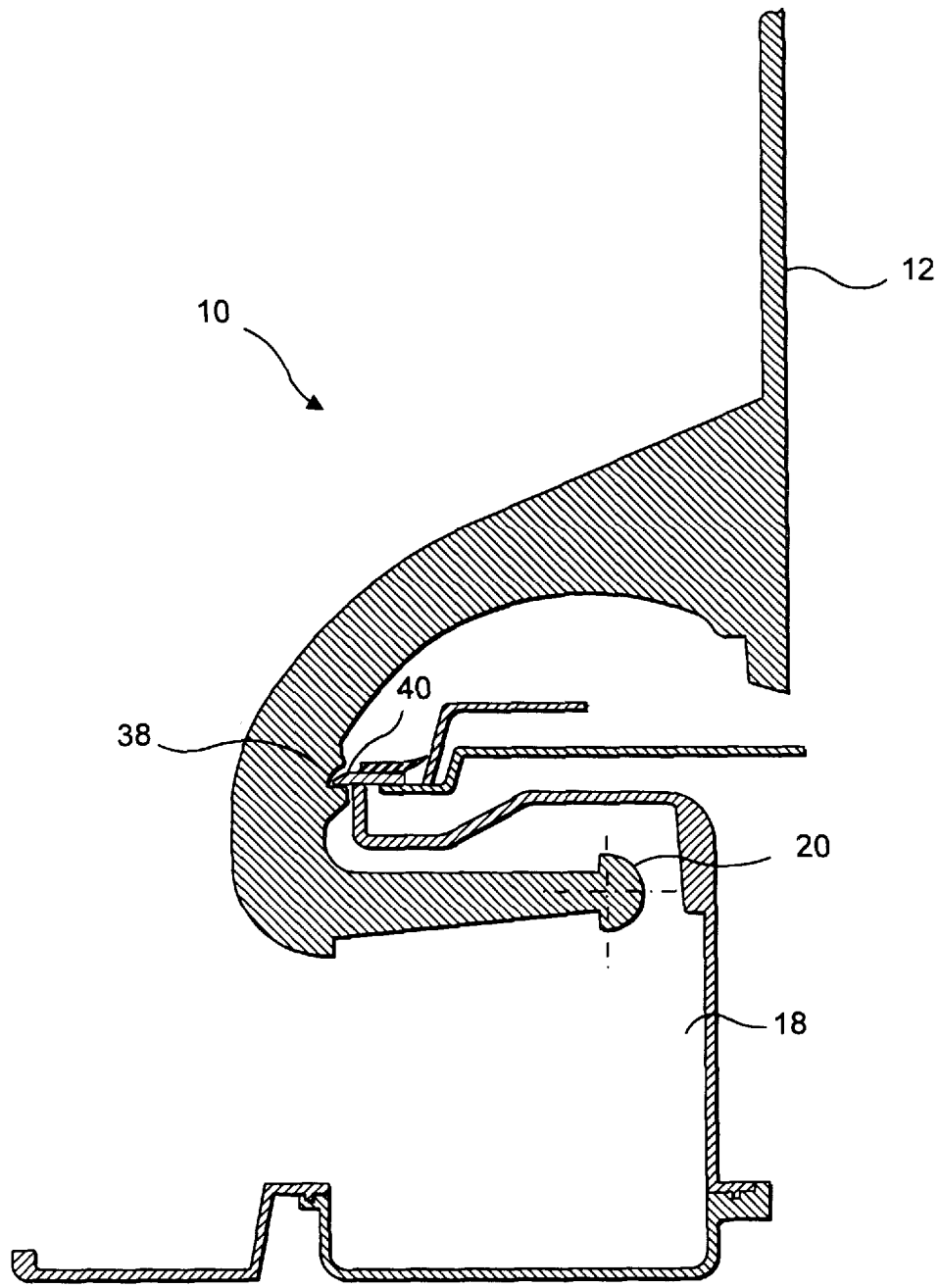
FIG. 4 is a cross-sectional view of the fuel door assembly in a fully opened condition.

FIG. 4 is a cross-sectional view of the fuel door assembly 10 in its fully opened condition. Hinge member 20 includes a notch 38 for snapping edge 40 of fuel housing 14 thereinto to hold door 12 in a fully opened condition.

Figure 5:
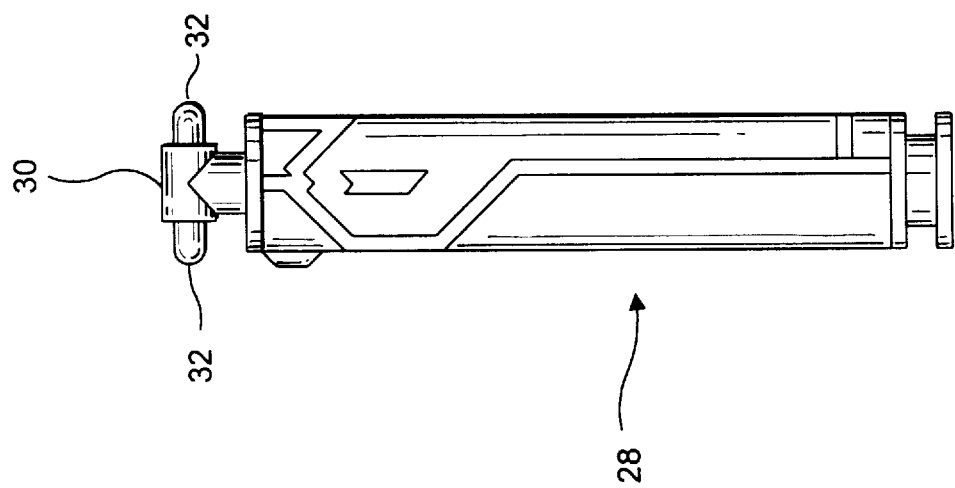
FIG. 5 is a plan view of the piston of the push-push lock used in the fuel door assembly.

FIG. 5 is a plan view of the piston 28 of push-push lock 24.

Figure 6:
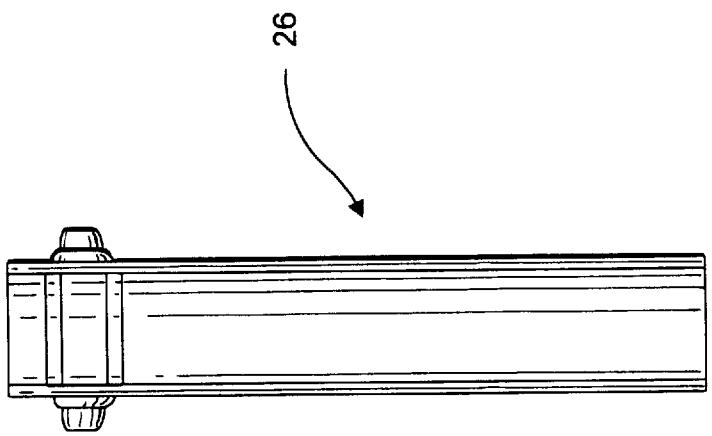
FIG. 6 is a plan view of the housing of the push-push lock.

FIG. 6 is a plan view of the housing 26 of push-push lock 24.

Push-push lock 24 functions in the same manner as the air damper assembly disclosed in commonly assigned U.S. Pat. No. 5,518,223 to Bivens, the teachings of which are incorporated herein by reference.

Modifications to the above would be obvious to those of ordinary skill in the art, but would not bring the invention so modified beyond the scope of the appended claims.

What is claimed is:

1. A fuel door assembly comprising:

a housing, said housing having an open main compartment including an opening to which a tube leading to a fuel tank may be attached;

a door, said door covering said main compartment when in a closed condition and being hingedly connected to said housing, said door including a latch by which it is maintained in said closed condition covering said main compartment; and a push-push lock attached to said main compartment, said push-push lock being reciprocatingly operable between a first fixed position and a second fixed position and being engagable with said latch, said door being locked in a fully closed condition upon said main compartment when said push-push lock is in said first fixed position and partially opened with respect thereto when said push-push lock is in said second fixed position.

2. A fuel door assembly as claimed in claim 1 wherein said housing further comprises a side compartment, and wherein said door is hingedly connected within said side compartment.

3. A fuel door assembly as claimed in claim 2 wherein said door further comprises a hinge element disposed in said side compartment when said door is in a fully closed condition, said hinge element having a notch facing an edge of said main compartment when said door is fully opened, said edge being snappingly engagable with said notch to maintain said door in a fully opened condition.

* * * * *